United States Patent [19]

Dziewolski

[11] 4,187,034
[45] Feb. 5, 1980

[54] RIGID JOINT ASSEMBLY

[76] Inventor: Richard Dziewolski, 8 Bis rue Jules Ferry, 92100 Boulogne, France

[21] Appl. No.: 792,127

[22] Filed: Apr. 29, 1977

[30] Foreign Application Priority Data

May 5, 1976 [FR] France .............................. 76 13324
May 20, 1976 [FR] France .............................. 76 15290
Jul. 28, 1976 [FR] France .............................. 76 22925

[51] Int. Cl.² .................. F16D 1/00; F16D 3/00; F16G 11/00
[52] U.S. Cl. .................................. 403/217; 52/693
[58] Field of Search ............... 403/169, 178, 187, 189, 403/49, 217, 292; 52/655, 665, 669, 693, 694, 695, 729, 726, 731, 732

[56] References Cited

U.S. PATENT DOCUMENTS

| 183,160 | 10/1876 | Haughian | 52/729 X |
|---|---|---|---|
| 426,558 | 4/1890 | Dithridge | 52/729 X |
| 3,922,101 | 11/1975 | Salmon et al. | 403/292 |

FOREIGN PATENT DOCUMENTS

| 344306 | 4/1922 | Fed. Rep. of Germany | 403/217 |
|---|---|---|---|
| 1559369 | 1/1969 | France | 403/217 |
| 282965 | 9/1952 | Switzerland | 52/655 |

*Primary Examiner*—Wayne L. Shedd
*Attorney, Agent, or Firm*—Merchant, Gould, Smith, Edell, Welter & Schmidt

[57] ABSTRACT

The present invention is concerned with a rigid assembly joint for connecting at least one longitudinal tubular element of a framework structure to at least one traverse tubular element of the said structure.

More particularly the present invention deals with a rigid assembly joint of two tubular longitudinal elements and at least one traverse tubular element of a framework structure which consists substantially of metallic tubes of generally circular cross section, an assembly joint in which the two longitudinal tubular elements are joined in an abutting relationship, while the traverse tubular element forms an angle with at least one of the longitudinal tubular elements.

4 Claims, 13 Drawing Figures

RIGID JOINT ASSEMBLY

The present invention is concerned with a rigid assembly joint for connecting at least one longitudinal tubular element of a framework structure to at least one traverse tubular element of the said structure.

More particularly the present invention deals with a rigid assembly joint of two tubular longitudinal elements and at least one traverse tubular element of a framework structure which consists substantially of metallic tubes of generally circular cross section, an assembly joint in which the said two longitudinal tubular elements are jointed in an abutting relationship, while the said traverse tubular element forms an angle with at least one of the said longitudinal tubular elements. The term "traverse tubular element", as used in the present disclosure, designates a cross member, a brace, a strut, a rib or any similar structural elements.

It is known to assemble longitudinal tubular elements used to build framework structures by means of flanges arranged at the respective adjacent ends of the longitudinal tubular elements, said flanges being joined to each other by bolts or rivets, or by welding or similar jointing means.

It is also known to provide assembly joints of the kind considered herein by means of sleeves wherein the end portions of the longitudinal tubular elements to be assembled are inserted by force and/or fixed by welding.

These methods of assembling longitudinal tubular elements of the kind described herein above are expensive since they necessitate the use of special parts and a specialized personal. I many cases the above mentioned known assembly joints can be achieved only by time-consuming, complicated and consequently quite expensive operations.

Furthermore when it is desired to assemble in accordance with the known assembling methods two longitudinal tubular elements and at least one traverse tubular element forming a certain angle with at least one of the said longitudinal tubular elements, it is necessary to provide special assembling parts which are fixed onto said longitudinal tubular elements and said traverse tubular elements by riveting,, bolting, welding or similar means. This entails considerable expense in material, machining and assembling operations.

The object of the present invention is to provide an assembly joint which allows the drawbacks of the above described known assembly joints to be overcome, which can be easily accomplished by using a minimum number of parts with a simple configuration, and which has mechanical strength properties at least equal to those of the known assembly joints of the kind considered herein.

According to the invention this object is achieved by an assembly joint comprising the following features: the adjacent respective end portions of the two longitudinal tubular elements are flattened for a predetermined length and juxtaposed in a substantially abutting relationship in such a way that these end portions define a common plane and that the said flattened end portions define two external walls, at least one first butt-strap member being fixed onto one of the two external walls and extending over a major portion of the length of the latter, while at least the other external wall is covered by a connecting member fixed onto said flattened end portions of said longitudinal tubular elements and connected to a flattened end portion of said traverse tubular element.

In one embodiment of the invention the said connecting member comprises at least one flat inclined portion forming an angle with the common plane defined by said flattened portions of the above mentioned longitudinal tubular elements, while said flattened end portion of the said traverse tubular element is fixed onto this inclined flat portion of the said connecting member.

In another embodiment of the invention the said first butt-strap member and the said connecting member are fixed, respectively, onto the opposed outer walls of the said flattened end portion of the above mentioned longitudinal tubular elements.

In one particular embodiment the said connecting member comprises at least two flat inclined portions each one fixed to the flat end portion of at least one corresponding traverse tubular element.

In another embodiment of the invention the said connecting member is fixed onto said flattened end portions of said longitudinal tubular elements by means of a second butt-strap member placed between said connecting member and the corresponding external wall formed by the said flattened end portions of said longitudinal tubular elements.

In still another embodiment of the invention the said first butt-strap member is associated to a connecting member.

In yet another embodiment of the invention the butt-strap members and the connecting members are fixed by any convenient technic, such as riveting, bolting, welding, gluing and so forth.

According to one modification of the invention of said connecting member is fixed onto the said second butt-strap member by welding, while the said second butt-strap is fixed onto said flattened end portions of the said longitudinal tubular elements and onto said first butt-strap member by means of bolts or similar assembling means.

In one embodiment of the invention the said flattened end portions of said longitudinal elements have a substantially constant thickness over their entire width, the latter being larger than the diameter of the said longitudinal tubular elements.

In another embodiment of the invention the said flattened end portions of said longitudinal tubular elements have a substantially I-shaped cross-section.

In another embodiment of the invention the longitudinal edges of said flattened end portions of the longitudinal tubular elements have portions with a substantially circular cross-section the diameter of which is larger than the thickness of the remaining portions located between said portions of substantially circular cross-section.

According to one modification of the invention the said flattened end portions of said longitudinal tubular elements have a substantially U-shaped profile.

In one particular embodiment of the invention the instant assembly joint also comprises an internal butt-strap member located between the respective opposed inner walls of said flattened end portions of said longitudinal tubular elements and having a profile substantially similar to that of said flattened end portions of the longitudinal tubular elements.

In another embodiment of the invention the said first butt-strap member has folded longitudinal edge portions adapted to increase the flexional and torsional strength of said butt-strap member.

The invention will now be described in a more detailed manner with reference to the appended drawing which shows several embodiments of the invention, by way of illustration, but not of limitation.

In the drawing.

In the following description and in the drawing, identical reference numerals are used to designate similar or identical elements.

Figures 1, 2:
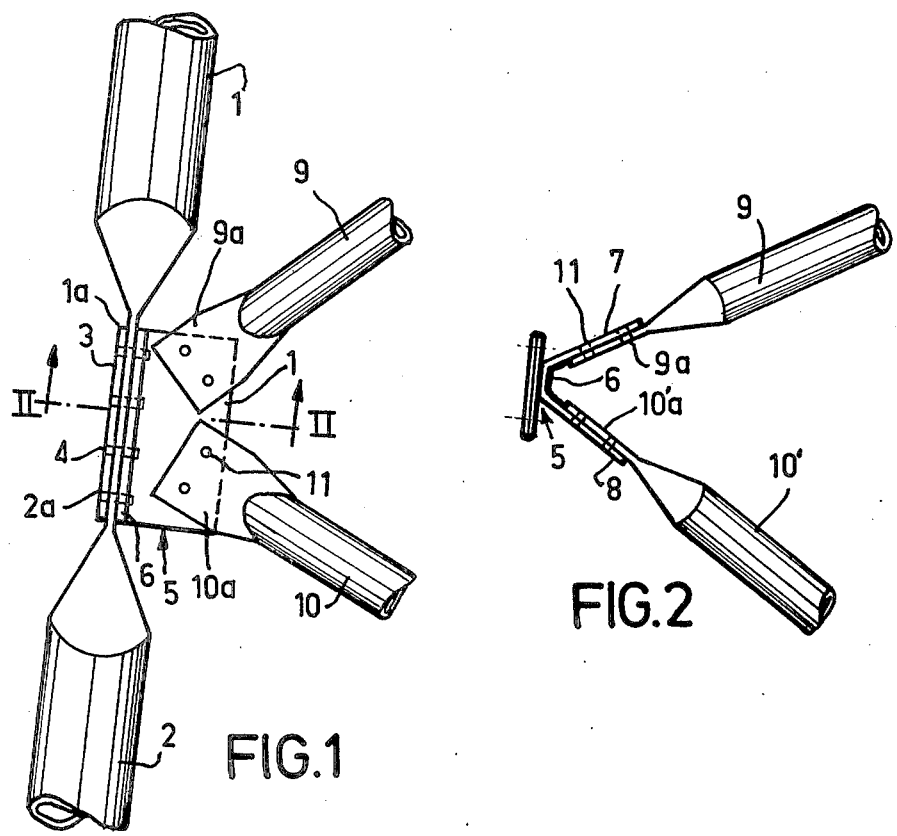
FIG. 1 is a side view, partially in section, of an assembly joint according to the invention.
FIG. 2 represents the assembly joint according to FIG. 1, partially in section along the line II—II of FIG. 1.

FIG. 1 shows two longitudinal tubular elements 1, 2 having each a flattened end portion designated by 1a and 2a, respectively. These flattened end portions are juxtaposed in an abutting relationship at the level indicated by the section line II—II. Bolts such as the one schematically indicated at 4 are inserted in convient holes provided in the flattened end portion 1a, 2a, as well as corresponding holes provided in a butt-strap member 3 mounted onto one of the external walls defined by the two flattened end portion 1a and 2a. One connecting member 5, having a brace-like configuration, and comprising two flat folded portions 7, 8 and a flat bottom or base portion 6, as clearly shown in FIG. 2, is provided in said bottom portion with holes corresponding to those of the flattened end portions 1a, 2a and the butt-strap member 3 is fixed onto the opposite external wall of said flattened end portions by means of the above mentioned bolts 4. It will be easily understood that consequently the longitudinal tubular elements 1 and 2, the flattened end portions 1a and 2a of which extend in a plane parallel to the longitudinal axis of each one of said longitudinal tubular elements, or—in the case of the embodiment shown in FIGS. 1 and 2—in a plane containing said longitudinal axis, are assembled and maintained in a coaxial position.

As shown in FIG. 1 and 2, each one of the flat portion 7, 8 of the connecting member 5 holds two traverse tubular elements forming an angle with the common longitudinal axis of the longitudinal tubular elements 1 and 2, and also forming an angle between themselves. It should be noted that in FIGS. 1 and 2 only three traverse tubular elements are shown, on the one hand, traverse tubular element 9 and 10 connected to the folded portion 7 of connecting member 5 (FIG. 1), and on the other hand, the same traverse tubular element 9 and traverse tubular element 10' connected to the folded portion 8 of said connecting member (FIG. 2). Each one of the traverse tubular elements 9, 10, 10' comprises a flattened end portion 9a, 10a, 10'a with holes registering with corresponding holes provided in said folded portions 7, 8 of the connecting member; bolts such as indicated schematically at 11 rigidly attach the traverse tubular elements mentioned herein above to said folded portions 7, 8 of the connecting member 5 mentioned above.

In the embodiment shown in FIGS. 6, 7, 8 and 9, the flattened end portions 1a, 2a of two longitudinal tubular elements 1, 2 are assembled in an abutting relationship along the line VII—VII, and are associated to a first butt-strap member 3 and a second butt-strap member 12 disposed on the external wall of flattened end portion 1a, 2a opposite to the wall thereof which carries the butt-strap member 3. A connecting member 5 is welded, by its portions 6, by means of welding beads 13, onto the butt-strap member 12 and comprises two flat portions 7, 8. The butt-strap member 12, the flattened end portions 1a and 2a of the longitudinal tubular element 1 and 2 and the butt-strap-member 3 are provided with mutually registering holes adapted to receive bolts such as those shown schematically at 4. Flat portions 9a, 10a and 10'a of traverse tubular elements 9, 10 and 10', similar to those described with reference to FIGS. 1 and 2, are fixed by bolts II onto the above mentioned folded flat portions of connecting member 5, said bolts II extending through registering holes conveniently provided in folded flat portions 7, 8 of connecting member and in the flattened end portion 9a, 10a and 10'a of the traverse tubular elements 9, 10, 10'.

Figure 8:
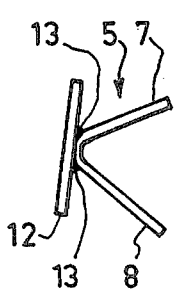
FIG. 8 shows a detail of the assembly joint according to the invention.
Figure 9:
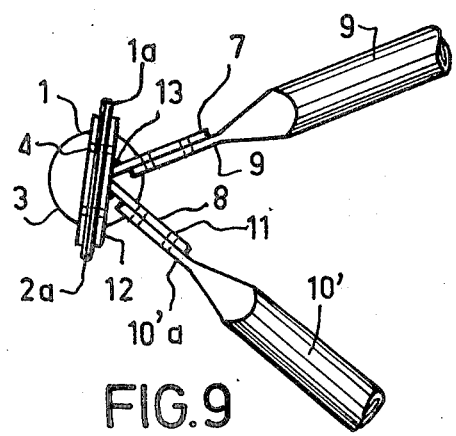
FIG. 9 is a partially cross-sectional view of the assembly joint with the detail shown in FIG. 8.

It should be noted that in this embodiment of the invention, the connecting member 5 may comprise, in a modification of the invention, a flat base portion similar to the one shown in FIG. 2, and may be fixed to the butt-strap members 3 and 12, as well as to the flattened end portions 1a, 2a of the longitudinal tubular elements 1, 2 by means of bolts or similar assembling means, instead of being welded onto the butt-strap member 12 as indicated in FIGS. 8 and 9.

Figure 3:
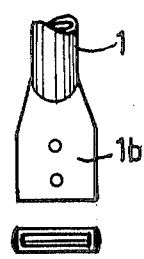
FIGS. 3, 4 and 5 show various configurations of the flattened end portion of a longitudinal tubular element.
Figure 4:
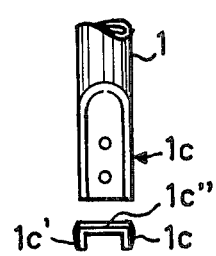

The flattened end portions of the longitudinal tubular elements 1, 2 may have various profiles. They may be simply flattened out or crushed, as shown at 1b in FIG. 3, in which case the flattened end portion has, of course, a width larger than the diameter of the tube proper. The may also be shaped so as to define a U-like profile, (1c in FIG. 4), and thus comprise bottom portion 1c" and two lateral flange portions 1c'. Furthermore, these flattened portions of 1a and 2a of the longitudinal tubular elements 1 and 2, respectively, may also comprise a flat central bottom portion 1d" and two lateral beadlike portions 1d' of a substantially circular cross-section, as shown at 1d in FIG. 5, The profiles shown schematically in FIG. 4 and 5 confer on the assembly joint a higher rigidity, and more particularly a higher torsional strength, a higher bending strength and a higher buckling strength. In the modified embodiments shown in FIGS. 4 and 5, the flattened end portions in question may have a width at least substantially equal to the diameter of the tubular portion of the considered tubular member.

Figure 5:
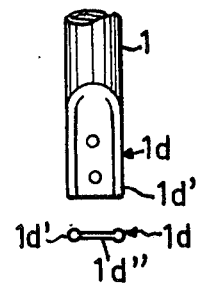
Figure 6:
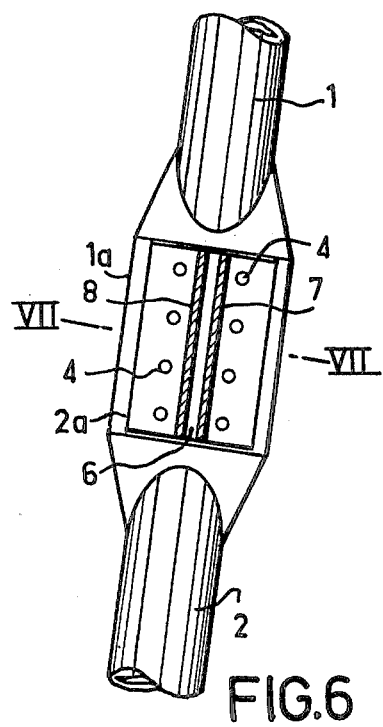
FIG. 6 shows a side view, partially in section, of another embodiment of the assembly joint according to the invention.
Figure 7:
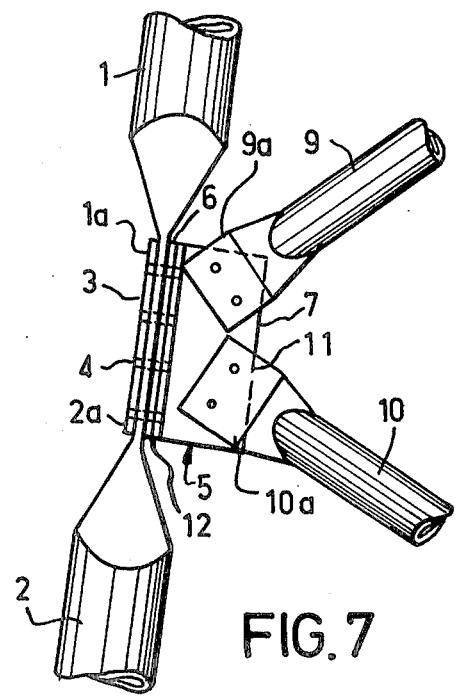
FIG. 7 shows the assembly joint according to FIG. 6, also in the form of a side view, but in a plane perpendicular to that of the view shown in FIG. 6.
Figure 10:
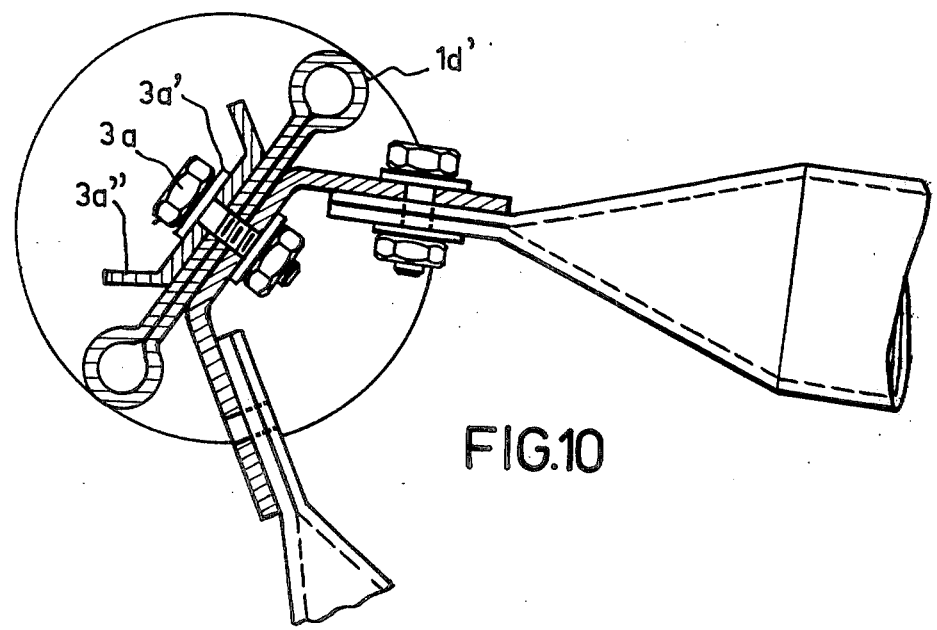
FIG. 10 is a view, partially in cross-section, of a modified embodiment of the assembly joint according to the invention.

In another embodiment of the assembly joint according to the invention, which is shown in FIG. 10 of the drawing, and wherein the profile of the flattened end portions of the longitudinal tubular elements 1, 2 corresponds to that shown at 1d in FIG. 5, the butt-strap member 3a arranged on the wall or surface of the aforementioned end portions 1d, which is opposed to the wall or surface carrying a connecting element 5 according to FIGS. 1 and 2, has a profile comprising a flat portion 3a' applied onto the associated wall of the flattened end portions 1d, and two folded portions 3a'', whereby an increased rigidity is imparted to the assembly joint. It should be well understood that the butt-strap member 3a, according to FIG. 10, may be used in a similar way in any one of the embodiments described herein.

Figure 11:
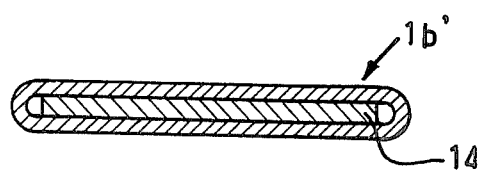
FIG. 11, 12 and 13 are cross-sectional views showing various profiles of flattened end portions of longitudinal tubular elements adapted to be assembled in accordance with the present invention.

According to another embodiment of the invention, which is shown in FIG. 11, the two flattened end portions 1b of the longitudinal tubular elements 1, 2 enclose an internal butt-strap member 14 arranged between the two respective walls of said two flattened end portions so as to connect the latter to each other, and to facilitate the guiding of the said longitudinal tubular elements when they are being assembled; furthermore, said internal butt-strap member 14 increases the mechanical strength of the finished assembly joint. In fact, the said internal butt-strap member 14 not only results in an increase of the torsional and buckling strength of the assembly joint, but it also decreases the shearing load acting on the bolts 4 (cf. FIG. 1, for example), by providing for a more favourable distribution of the shearing forces to which said bolts are exposed.

Figure 12:
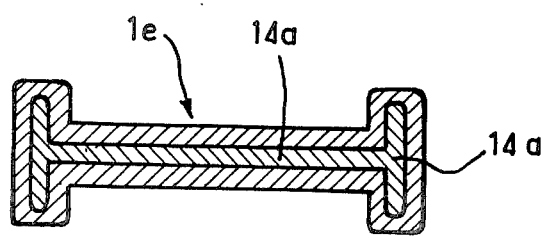

FIG. 12 also shows an internal butt-strap member 14a similar to the butt-strap member 14 represented in FIG. 11, but which comprises lateral flanges designated by reference numeral 14a', so as to correspond to the I-shaped profile of each one of the flattened end portions of the longitudinal tubular elements of this particular embodiment. This butt-strap member can be constituted by one or more parts, and is preferable constituted by one or three parts.

Figure 13:
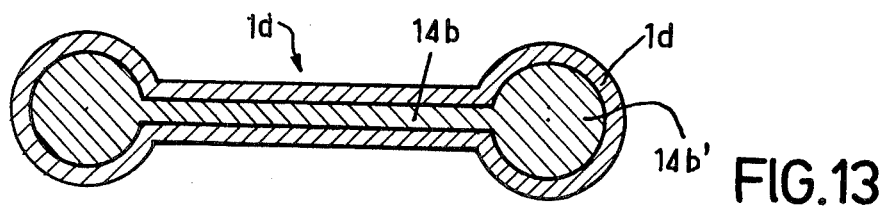

In the embodiment shown in FIG. 13, wherein the flattened end portions, such as the ones shown at 1d, of the longitudinal tubular element 1, 2 have longitudinal bead-like portions of a substantially circular cross-section, as described herein above (cf. FIG. 5), an internal butt-strap member 14b similar to those above at 14 and 14a in FIGS. 11 and 12, respectively, is also provided; this internal butt-strap member 14b has beads 14' corresponding to the internal profile of the longitudinal beads 1d of the flattened end portions, such as described herein above. This internal butt-strap member may also be constituted by one or more parts, and is preferably constituted by one or three parts.

The above described assembly joint may be used advantageously in any tubular structures comprising tubular columns or longitudinal tubular elements or traverse tubular elements fixed onto the same. Said assembly joint is particularly adapted to be used in the field of construction of framework towers constituted substantially by tubular construction elements.

It should be well understood that the instant invention is not limited to the embodiments described herein above and shown in the appended drawing. Numerous modifications may be made by any person skilled in the art, without departing from the spirit and the scope of the invention as defined in the following claims.

What is claimed is:

1. A structural joint comprising, in combination:
   (a) first and second longitudinal metallic tubular members of generally circular cross section, arranged in coaxial, longitudinally abutting relationship, adjacent end portions of said longitudinal tubular members being flattened over a predetermined length into a configuration in which they jointly define two flat, mutually spaced, external longitudinal wall portions which are parallel to each other and are parallel and symmetrical with respect to the common geometrical axis of said longitudinal tubular members;
   (b) an external butt-strap member having a flat wall portion placed in engagement with one of said flat wall portions of the longitudinal members over at least a major portion of said predetermined length thereof;
   (c) a connecting member having a central flat wall portion engaging the other of said flat wall portions of the longitudinal members over a major portion of the length thereof, and having two lateral flat wall portions each forming a predetermined dihedral angle with said central wall portion;
   (d) an internal butt-strap member, at least a major portion of which is received in the space between said flat wall portions of the longitudinal members, and which extends over at least a major portion of said predetermined length thereof;
   (e) first connecting means rigidly interconnecting said flat wall portions of the longitudinal tubular members, said external butt-strap member, said internal butt-strap member, and said connecting member along said predetermined length;
   (f) at least two further tubular members of generally circular cross section having each a flattened end portion containing the geometrical axis of the related one of said further members and symmetrical to said axis of the related further member; and
   (g) second connecting means rigidly securing the flattened end portions of said further members to at least one of said lateral flat wall portions of said connecting member.

2. The structural joint of claim 1, wherein the longitudinal edges of said flattened wall portions of said longitudinal members are provided respectively with longitudinal hollow portions having a thickness larger than that of the total thickness of said flattened wall portion of the longitudinal members, and wherein said internal butt-strap member has its longitudinal edges provided with thickened portions which substantially fill said hollow portions.

3. A structural joint according to any one of claims 1 or 2, wherein said internal butt-strap member has longitudinally extending flangelike stiffening portions.

4. The structural joint of claim 1, wherein each one of said lateral flat portions of the connecting member is secured to the respective flattened end portions of at least a pair of said further tubular members.

* * * * *